United States Patent [19]
Hillqvist

[11] Patent Number: 5,829,769
[45] Date of Patent: Nov. 3, 1998

[54] DAMPING DEVICE FOR STABILIZERS FOR MOTOR VEHICLES AND A METHOD OF MOUNTING OF THIS

[75] Inventor: Lennart Hillqvist, Hisings-Backa, Sweden

[73] Assignee: AB Volvo, Göteborg, Sweden

[21] Appl. No.: 776,692

[22] PCT Filed: Aug. 21, 1995

[86] PCT No.: PCT/SE95/00950

§ 371 Date: Jun. 9, 1997

§ 102(e) Date: Jun. 9, 1997

[87] PCT Pub. No.: WO96/05976

PCT Pub. Date: Feb. 29, 1996

[30] Foreign Application Priority Data

Aug. 22, 1994 [SE] Sweden ................................. 9402788

[51] Int. Cl.⁶ .................................................. B60G 00/00
[52] U.S. Cl. .................................. 280/124.107; 267/189; 267/276; 267/141
[58] Field of Search ..................................... 280/689, 723, 280/721, 695, 700, 673, 716, 717, 124.106, 124.107, 124.152, 124.166, 124.177; 267/188, 189, 276, 292, 293, 141, 141.2, 141.3

[56] References Cited

U.S. PATENT DOCUMENTS

| | | | |
|---|---|---|---|
| 2,027,577 | 1/1936 | Crane | 267/189 |
| 2,194,832 | 3/1940 | McIntyre | 267/189 |
| 3,181,885 | 5/1965 | Baracos et al. | 280/723 |
| 3,448,994 | 6/1969 | King et al. | 280/689 |
| 4,113,278 | 9/1978 | Rissberger | 280/689 |
| 4,192,529 | 3/1980 | Shiratori et al. | 280/689 |
| 5,064,216 | 11/1991 | Hynds | 280/689 |

FOREIGN PATENT DOCUMENTS

| | | |
|---|---|---|
| 0272851 A2 | 6/1988 | European Pat. Off. . |
| 0547945 A1 | 6/1993 | European Pat. Off. . |
| 0623483 A1 | 11/1994 | European Pat. Off. . |
| 4204252 A1 | 8/1993 | Germany . |
| 63-207708 | 8/1988 | Japan ................................. 280/723 |

*Primary Examiner*—Peter C. English
*Attorney, Agent, or Firm*—Burns, Doane, Swecker & Mathis, L.L.P.

[57] ABSTRACT

A damping device for motor vehicle stabilizers includes a resilient bushing and a mounting sleeve. The bushing is adapted to enclose or encircle the stabilizer under the clamping force of the mounting sleeve. The bushing is defined by a non-split sleeve having a cylindrical portion and a through-hole concentric with the cylindrical portion. The mounting sleeve has a cylindrical through-opening possessing an inner diameter that is smaller than the outer diameter of the cylindrical portion of the bushing when the bushing is uninfluenced by external forces. The bushing in the mounted position is clamped by the mounting sleeve under the symmetrical clamping effected by the resilient material from which the bushing is made.

10 Claims, 2 Drawing Sheets

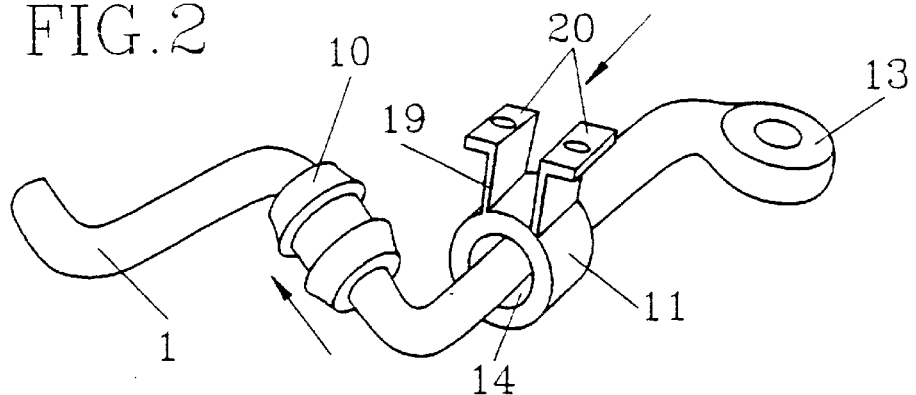
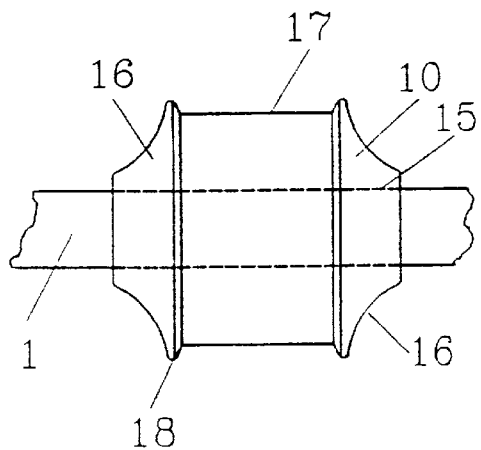
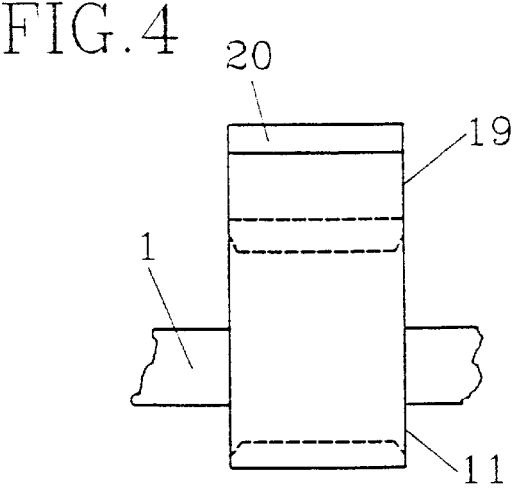
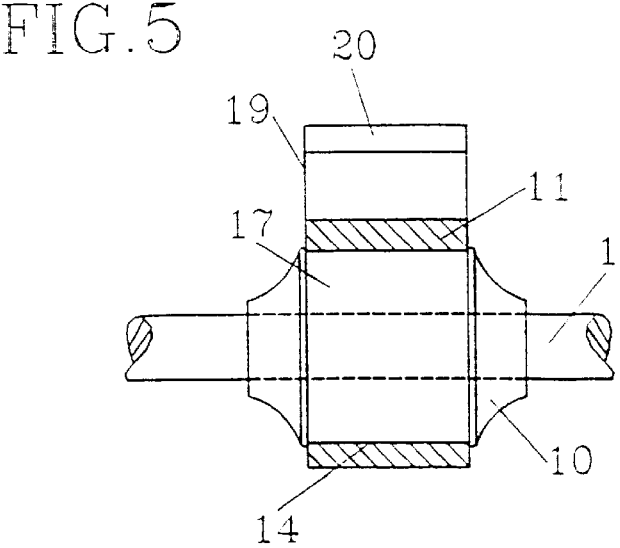

5,829,769

DAMPING DEVICE FOR STABILIZERS FOR MOTOR VEHICLES AND A METHOD OF MOUNTING OF THIS

FIELD OF THE INVENTION

The present invention refers to a damping device used in stabilizers for motor vehicles, of the kind comprising a resilient bushing with a through-hole, adapted under clamping to enclose the stabilizer, and to be clamped in a mounting device provided with attachment parts for dampening attachment to the body of the vehicle, wherein the bushing is constituted by a non-split sleeve with a substantially cylindrical external shape, and with its through-hole positioned concentrically in its cylindrical portion, whereby the mounting device is constituted by a sleeve having a cylindric through-opening and in a manner known per se equipped with attachment parts for attachment to the vehicle body.

The invention also encompasses a method for mounting such a damping device.

BACKGROUND OF THE INVENTION

In order to limit the swaying, to which a car is subjected due to the centrifugal forces, which act during cornering, stabilizers are used, which limit the swaying and equalize the load between the springs in the wheel suspension for the outer and inner front wheels. Such stabilizers consist of a rod having a substantially straight intermediate portion and angled end portions, attached to the different wheel suspensions. By subjecting the straight portion of the stabilizer to a torsion the swaying is counteracted, and for this purpose the stabilizer is attached to the vehicle body at or adjacent its straight intermediate portion via dampening rubber bushings.

Such rubber bushings earlier have been attached to the straight intermediate portion of the stabilizer, e.g. in that a profiled rubber body with a through-hole has been provided with a slot, which makes it easy to pull the bushing onto the stabilizer. Thereupon this slatted bushing has been attached to the vehicle body by means of a two-part attachment, in which the bushing has been clamped, preferably by tightening screw joints. This design however involves a risk that water during running of the vehicle will penetrate through the slot and thereby "lubricate" the cooperating surfaces, which gives rise to noise in form of squeaking and furthermore substantially reduces the service life of the bushing. Another method, which is used for eliminating these problems is that the stabilizer is positioned in a mould wherein the rubber bushing is vulcanized directly onto the arm. In this manner the problems of a short service life and high noise levels are highly reduced, but this method gives rise to a doubling of the manufacturing cost as compared to the slotted bushing. In both cases the profiled rubber body furthermore means that a large number of variants is needed for different car makes and models

SUMMARY OF THE INVENTION

The purpose of the invention is to provide a stabilizer with dampening bushings, which does not give rise to the above mentioned problems, at the same time as the manufacturing cost is the same as or even is below that of the earlier used slotted dampening bushings. The invention also incorporates a method for mounting such a dampening device.

BRIEF DESCRIPTION OF THE DRAWING FIGURES

Hereinafter the invention will be further described with reference to an embodiment illustrated in the accompanying drawings.

FIG. 2 shows a portion corresponding to FIG. 1 of a stabilizer with a bushing with associated mounting detail according to the present invention during mounting.

FIG. 3 shows a bushing according to the invention in a side view.

FIG. 4 is a side view of a mounting sleeve for the bushing according to FIG. 3, and FIG. 5 shows in side view and partly in cross section, the bushing according to FIG. 3 mounted in the sleeve according to FIG. 4.

DETAILED DESCRIPTION OF THE INVENTION

Figure 1:
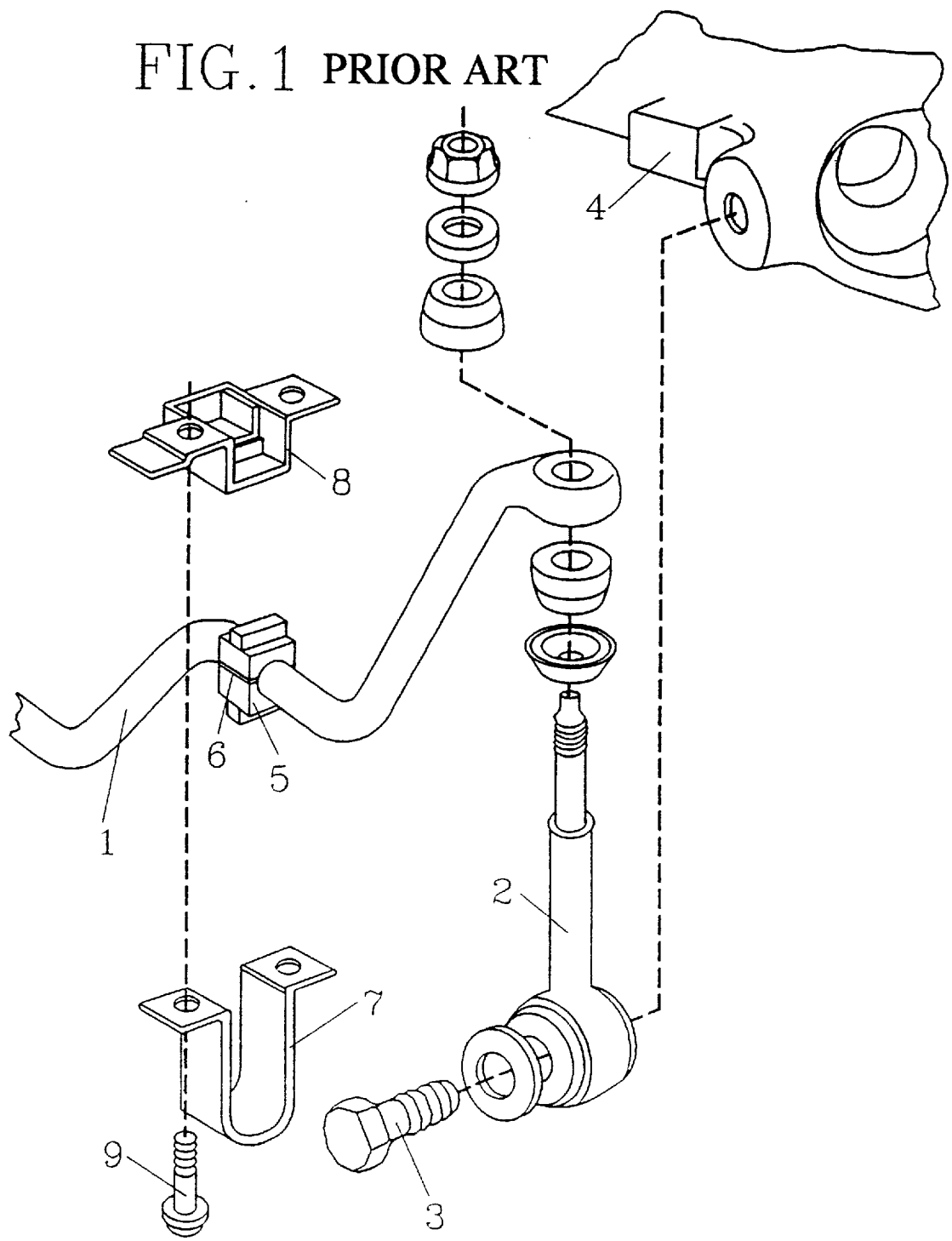
FIG. 1 shows in an exploded view a portion of a stabilizer equipped with a slotted rubber bushing according to the prior art and with the associated mounting members.

In FIG. 1 is diagrammatically shown a portion of a stabilizer 1, which at both ends is equipped with an ear whereby the stabilizer by means of washers, rubber bushings and a locking nut is arrestable to a sleeving bracket 4 of the wheel suspension. At a distance from each one of its ends the stabilizer is equipped with a rubber bushing 5, which in accordance with an embodiment according to the prior art is provided with a longitudinal slot 6, which makes it possible easily to pull the bushing 5 onto the arm of the stabilizer at a desired position along its extension. By means of a brace 7 and a bracket 8 the bushing is arrestable to a proper (not shown) detail of the body by means of flange screws 9, which at one hand bring about an attachment to the body and on the other hand causes a clamping of the bushing 5 around the stabilizer 1. Due to the external profiling of the bushing it however is difficult to obtain a uniform clamping force over the entire bushing, which upon tightening tends to be deformed in an uncontrolled manner so that leakages easily will occur in connection to the slot. This implies a risk that water will leak in during use of the vehicle, which in turn leads to strong noise in the form of squeaks and a short service life for the bushing.

In FIG. 2 is shown a portion of a stabilizer 1, corresponding to the stabilizer according to FIG. 1, with a rubber bushing 10 according to the present invention and a mounting sleeve 11 intended for cooperation therewith schematically during mounting on the stabilizer. The bushing 10 hereby is so flexible, that it without being slotted it can be pulled onto the bar-shaped portion of the stabilizer 1 past its end positioned attachment ear 13. The mounting sleeve 11 has an opening 14, intended to enclose the bushing 10, which has such a big inner diameter, that also the sleeve can be pushed In over the attachment ear 13 of the stabilizer.

Such as can be seen from FIG. 3 the bushing 10 is preferably constructed as a rotational symmetric, substantially cylindrical non-split sleeve or body, with a coaxially arranged through-hole 15. In a position uninfluenced by external forces, the through-hold 15 has an inner diameter, which does not exceed the outer diameter of the stabilizer 1 at the position where the bushing 10 shall be arrested to the stabilizer. The expression "substantially cylindric body" hereby shall be construed as a body, which can differ from the pure cylindric shape, and it may e.g. be slightly oval. In the embodiment illustrated the bushing 10 is equipped with conically sloping end portions 16 and between these end portions 16 and the cylindrical portion 17 of the bushing there are annular bosses or ridges 18. However, this design of the rubber bushing is not critical for the result aimed at, even if it is appropriate for facilitating a correct mounting of the mounting sleeve on the bushing. On the other hand the rotational symmetrical main form of the bushing 10 is essential to make it possible for the mounting sleeve 11 to provide a symmetrical clamping force around the bushing in the mounted position, which prevents mutual movements between the bushing and the stabilizer rod, and thereby eliminates noise and contributes to a substantially increased service life for the bushing.

In the illustrated, preferred embodiment the mounting sleeve 11, as can be seen from FIG. 2 and FIG. 4 has a tubular main portion with said coaxial through-opening 14, which has an inner diameter, which is smaller than the outer diameter of the cylindrical portion 17 of the rubber bushing, when the rubber bushing is not influenced by external forces. In the example illustrated the cylindrical sleeve is provided with two shanks 19 extending therefrom, and equipped with external flanges 20 with holes for attachment members, such as screws, by means of which the mounting sleeve 11 can be attached to any appropriate part of the vehicle body. The illustrated design of the attachment members for the mounting sleeve to the vehicle body is not limiting for the invention but only shows a possible solution among several different embodiments.

In FIG. 5 is finally illustrated how the rubber bushing 10 is fitted in the mounting sleeve 11, which with its opening 14 encloses the substantially cylindrical portion 17 of the rubber bushing and exerts, along the entire circumference thereof, a symmetrical and uniform clamping force against the rubber bushing 10, which is thereby clamped against the stabilizer 1, with a clamping force uniformly distributed about the entire inner circumference thereof. In the illustrated, mounted position the rubber bushing thus, due to radial inwardly directed compression, has a somewhat smaller outer diameter and a somewhat bigger length than the unclamped rubber bushing shown in FIG. 3.

Mounting of the rubber bushing 10 according to the invention upon the stabilizer 1 can be achieved in different manners, but principally two different methods may be used. In both cases the rubber bushing is inserted on the stabilizer by being pushed on from one end of the stabilizer. The excess measure the stabilizer end might have for forming an attachment, can be compensated in that the rubber bushing in this position can be stretched out. The through-opening 14 of the mounting sleeve is so big that it can be thread over the end of the stabilizer, thus that also the mounting sleeve can be pushed in over the stabilizer. By moving in one case the rubber bushing axially against a fixed or retractable stop member so that the bushing is retained axially it is possible thereupon to sideways press in the opening 14 of the mounting sleeve 11 via the conically sloping end portions 16 on the rubber bushing 10, thus that the bushing is compressed and the mounting sleeve will surround the cylindrical portion 17 of the bushing, with the ridge-formed portions 18 situated outside the side planes of the mounting sleeve. As an alternative to this it is possible to use a particular tool in form of a divided nozzle or jaws, in which the rubber bushing 10 is compressed when it has been moved to the correct position on the stabilizer, whereby the mounting sleeve is moved in over the pre-compressed rubber bushing. By relieving the load on the portions of the nozzle or on the jaws, the bushing is allowed to expand to a firm grip in the opening 14 of the mounting sleeve, whereby at the same time the rubber bushing is clamped on the stabilizer with a symmetrical clamping force.

By means of the design proposed it is possible to reduce to a very high extent the number of different rubber bushings for this purpose, at the same time as the manufacturing cost can be kept low, as the mounting sleeve at least in some embodiments may be extruded in aluminum and thereupon be cut to the desired width.

The mounting is also facilitated as compared to earlier embodiments and can be effected in automatons, which however do not form any part of the present invention and therefore will not be further described herein.

The invention is not limited to the embodiment shown in the drawings and described in connection thereto but modifications and variants are possible within the scope of the following claims

I claim:

1. A damping device for a stabilizer in a motor vehicle comprising a resilient bushing with a through-hole, the bushing being adapted under clamping to enclose a stabilizer and to be clamped in a mounting sleeve provided with attachment parts for dampening attachment to a body of the vehicle, the bushing being a non-split sleeve with a substantially cylindrical portion, and with the through-hole of the bushing being positioned concentrically in the cylindrical portion, the mounting sleeve having a through-opening, said through-opening in the mounting sleeve being cylindrical and having an inner diameter which is smaller than an outer diameter of the cylindrical portion of the bushing when the bushing is uninfluenced by external forces, the bushing in a mounted position within the mounting sleeve being clamped in the mounting sleeve under a symmetrical clamping effected by resilience of the bushing, and the bushing being provided with a sloping end portion on at least one side of the cylindrical portion.

2. A device as claimed in claim 1, wherein the bushing is provided with a pair of ridges for simplified establishment of a correct interconnection position of the bushing with the mounting sleeve.

3. A device as claimed in claim 2, wherein the ridges are circumferential raised portions, which surround said cylindrical portion on the bushing.

4. A method for mounting a damping device on a stabilizer, wherein the damping device includes a resilient bushing and a mounting sleeve, the bushing possessing a through-hole and being in the form of a non-split sleeve having a cylindrical portion, the mounting sleeve possessing a cylindrical through-opening having an inner diameter smaller than an outer diameter of the cylindrical portion of the bushing when the bushing is uninfluenced by external forces, the method comprising pushing the bushing onto the stabilizer from one end portion of the stabilizer, pushing the mounting sleeve onto the stabilizer from one end portion of the stabilizer, axially moving at least one of the bushing and the mounting sleeve during symmetrical radial compression of the bushing to cause the mounting sleeve to be advanced over a sloping end portion of the bushing and to position the bushing within the through-opening in the mounting sleeve so that the bushing under symmetrical clamping within the mounting sleeve is uniformly clamped about the stabilizer.

5. The method according to claim 4, including retaining the bushing in position on the stabilizer while the mounting sleeve is axially moved against the bushing at the sloping end portion of the bushing to produce a continuous compression of the bushing until the mounting sleeve is situated in a mounting position on the bushing.

6. The method according to claim 5, wherein the mounting position is a position in which the mounting sleeve encircles the cylindrical portion of the bushing.

7. The method according to claim 5, wherein the mounting position is a position in which the mounting sleeve is situated between two ridges provided on the bushing.

8. The method according to claim 5, wherein the mounting position is a position in which the mounting sleeve is situated between two ridges that are positioned at opposite ends of the cylindrical portion.

9. The method according to claim 4, wherein the mounting sleeve is axially moved to a mounting position on the bushing in which the mounting sleeve encircles the cylindrical portion of the bushing.

10. The method according to claim 4, wherein the mounting sleeve is axially moved to a mounting position on the bushing in which the mounting sleeve is positioned between two ridges on the bushing.

* * * * *